US009086890B2

(12) United States Patent
Olson et al.

(10) Patent No.: US 9,086,890 B2
(45) Date of Patent: Jul. 21, 2015

(54) DIVISION UNIT WITH NORMALIZATION CIRCUIT AND PLURAL DIVIDE ENGINES FOR RECEIVING INSTRUCTIONS WHEN DIVIDE ENGINE AVAILABILITY IS INDICATED

(75) Inventors: Christopher H. Olson, Austin, TX (US); Jeffrey S. Brooks, Austin, TX (US); Matthew B. Smittle, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 733 days.

(21) Appl. No.: 13/345,391

(22) Filed: Jan. 6, 2012

(65) Prior Publication Data
US 2013/0179664 A1   Jul. 11, 2013

(51) Int. Cl.
*G06F 9/38* (2006.01)
*G06F 7/535* (2006.01)
*G06F 7/537* (2006.01)
*G06F 9/30* (2006.01)
*G06F 7/499* (2006.01)

(52) U.S. Cl.
CPC .............. *G06F 9/3895* (2013.01); *G06F 7/535* (2013.01); *G06F 7/5375* (2013.01); *G06F 9/3001* (2013.01); *G06F 9/3875* (2013.01); *G06F 9/3885* (2013.01); *G06F 7/49936* (2013.01)

(58) Field of Classification Search
None
See application file for complete search history.

(56) References Cited

U.S. PATENT DOCUMENTS

| | | | |
|---|---|---|---|
| 4,761,757 A | 8/1988 | Sakai et al. |
| 4,939,686 A | 7/1990 | Fandrianto |
| 4,992,968 A | 2/1991 | Adiletta |
| 4,999,801 A | 3/1991 | Katsuno |
| 5,023,827 A | 6/1991 | Kehl et al. |
| 5,105,378 A | 4/1992 | Mori |
| 5,132,925 A | 7/1992 | Kehl et al. |
| 5,206,828 A | 4/1993 | Shah et al. |
| 5,258,944 A | 11/1993 | Smith |
| 5,272,660 A | 12/1993 | Rossbach |
| 5,301,139 A | 4/1994 | Zinger |
| 5,339,267 A | 8/1994 | Ito |
| 5,357,455 A | 10/1994 | Sharangpani et al. |

(Continued)

OTHER PUBLICATIONS

J. Arjun Prabhu and Gregory B. Zyner, "167 MHz Radix-8 Divide and Square Root Using Overlapped Radix-2 Stages," Proceedings of the 12th Symposium on Computer Arithmetic, 1995.

(Continued)

*Primary Examiner* — Kenneth Kim
(74) *Attorney, Agent, or Firm* — Meyertons, Hood, Kivlin, Kowert & Goetzel, P.C.

(57) ABSTRACT

Techniques are disclosed relating to integrated circuits that include hardware support for divide and/or square root operations. In one embodiment, an integrated circuit is disclosed that includes a division unit that, in turn, includes a normalization circuit and a plurality of divide engines. The normalization circuit is configured to normalize a set of operands. Each divide engine is configured to operate on a respective normalized set of operands received from the normalization circuit. In some embodiments, the integrated circuit includes a scheduler unit configured to select instructions for issuance to a plurality of execution units including the division unit. The scheduler unit is further configured to maintain a counter indicative of a number of instructions currently being operated on by the division unit, and to determine, based on the counter whether to schedule subsequent instructions for issuance to the division unit.

12 Claims, 12 Drawing Sheets

(56) References Cited

U.S. PATENT DOCUMENTS

| | | | |
|---|---|---|---|
| 5,404,324 A | 4/1995 | Colon-Bonet | |
| 5,515,308 A | 5/1996 | Karp et al. | |
| 5,619,439 A | 4/1997 | Yu et al. | |
| 5,696,712 A | 12/1997 | Prabhu et al. | |
| 5,757,688 A | 5/1998 | Chen et al. | |
| 5,787,030 A | 7/1998 | Prabhu et al. | |
| 5,798,955 A | 8/1998 | Matsubara | |
| 5,870,323 A | 2/1999 | Prabhu et al. | |
| 5,910,910 A | 6/1999 | Steele, Jr. | |
| 5,928,318 A | 7/1999 | Araki | |
| 5,954,789 A | 9/1999 | Yu et al. | |
| 6,108,682 A | 8/2000 | Matheny | |
| 6,351,760 B1 | 2/2002 | Shankar et al. | |
| 6,487,575 B1 * | 11/2002 | Oberman | 708/504 |
| 6,549,926 B1 | 4/2003 | Kalambur et al. | |
| 6,564,239 B2 | 5/2003 | Matson et al. | |
| 6,594,681 B1 | 7/2003 | Prabhu | |
| 6,625,633 B1 | 9/2003 | Hirairi | |
| 6,751,645 B1 | 6/2004 | Gorshtein et al. | |
| 7,539,720 B2 | 5/2009 | Olson | |
| 2004/0249877 A1 | 12/2004 | Gerwig | |
| 2010/0250639 A1 | 9/2010 | Olson et al. | |

OTHER PUBLICATIONS

Neil Burgess and Chris Hinds, "Design issues in radix-4 SRT square root & divide unit," Thirty-Fifth Asilomar Conference on Signals, Systems and Computers, 2001.

Chin-Chieh Chao, Statutory Invention Registration, Reg. No. US H1993 H, published Sep. 2, 2001.

* cited by examiner

US 9,086,890 B2

DIVISION UNIT WITH NORMALIZATION CIRCUIT AND PLURAL DIVIDE ENGINES FOR RECEIVING INSTRUCTIONS WHEN DIVIDE ENGINE AVAILABILITY IS INDICATED

BACKGROUND

1. Technical Field

This disclosure relates to processors, and more specifically to facilitating execution of divide instructions and/or square root instructions.

2. Description of the Related Art

Many processor implementations include hardware support for floating-point arithmetic, and in particular for floating-point divide operations and square root operations. Because of the complexity with performing these operations, execution of these instructions can have high latencies. While the percentage of these instructions is relatively low in most applications, their high latencies can significantly impact processor performance.

SUMMARY

The present disclosure relates to an integrated circuit that is configured to execute divide instructions. In various embodiments, the integrated circuit includes a division unit that, in turn, includes multiple divide engines configured facilitate the execution of multiple divide instructions in parallel.

In some embodiments, the division unit may include a normalization circuit configured to normalize sets of operands of divide instructions. In such embodiments, each divide engine may be configured to operate on a respective normalized set of operands received from the normalization circuit.

In some embodiments, the division unit may include a common divide post-engine coupled to the divide engines. In such embodiments, each divide engine may be configured to request usage of the divide post-engine from an arbitration unit configured to grant a single request within a particular interval.

In some embodiments, the integrated circuit may include a scheduler unit configured to select instructions for issuance to multiple execution units including the division unit. In such embodiments, the scheduler unit may be configured to maintain a counter indicative of a number of instructions currently being operated on by the division unit, and to determine, based on the counter, whether to schedule subsequent instructions for issuance to the division unit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Figure 1:
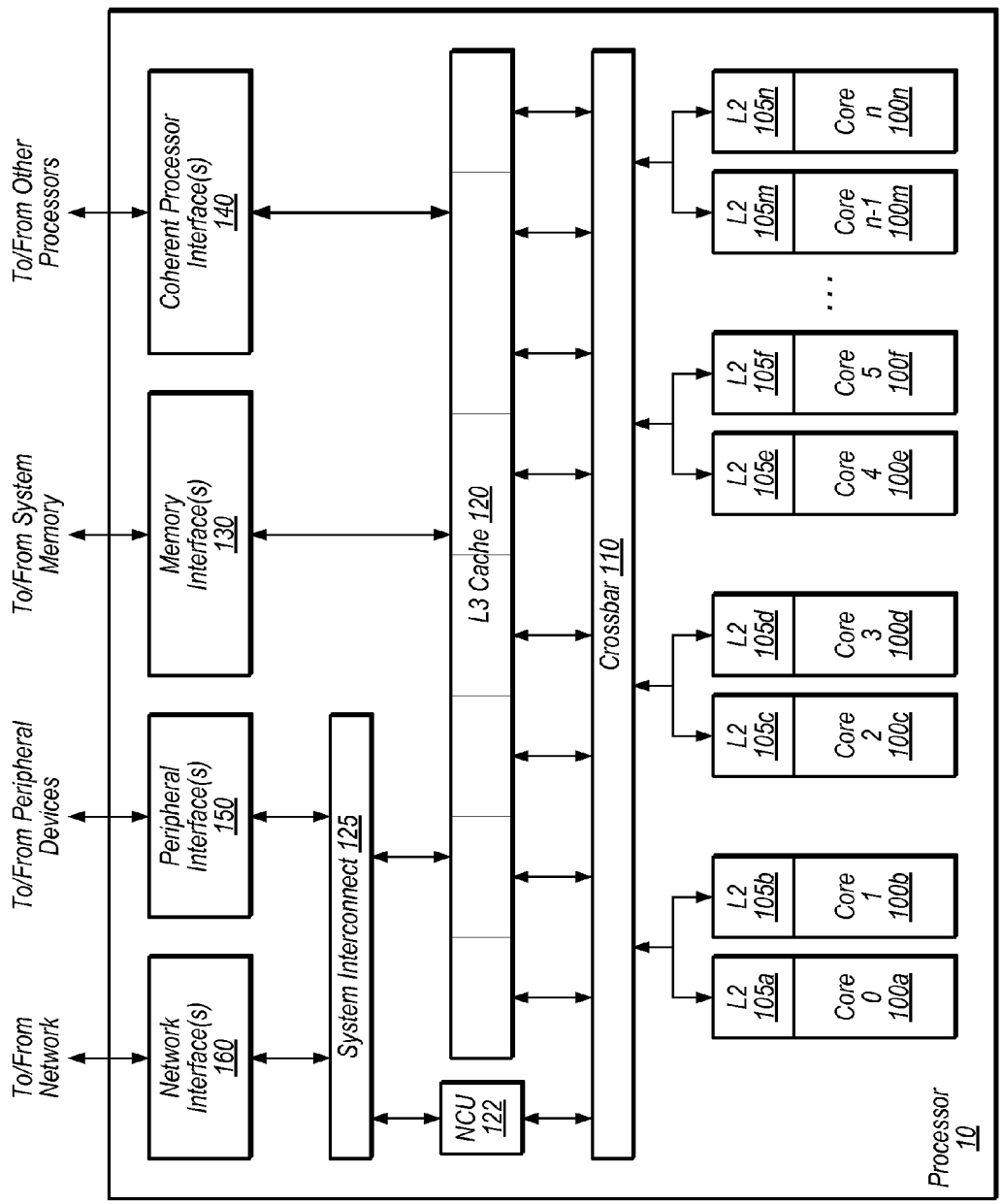
FIG. 1 is a block diagram illustrating one embodiment of an exemplary processor.
Figure 2:
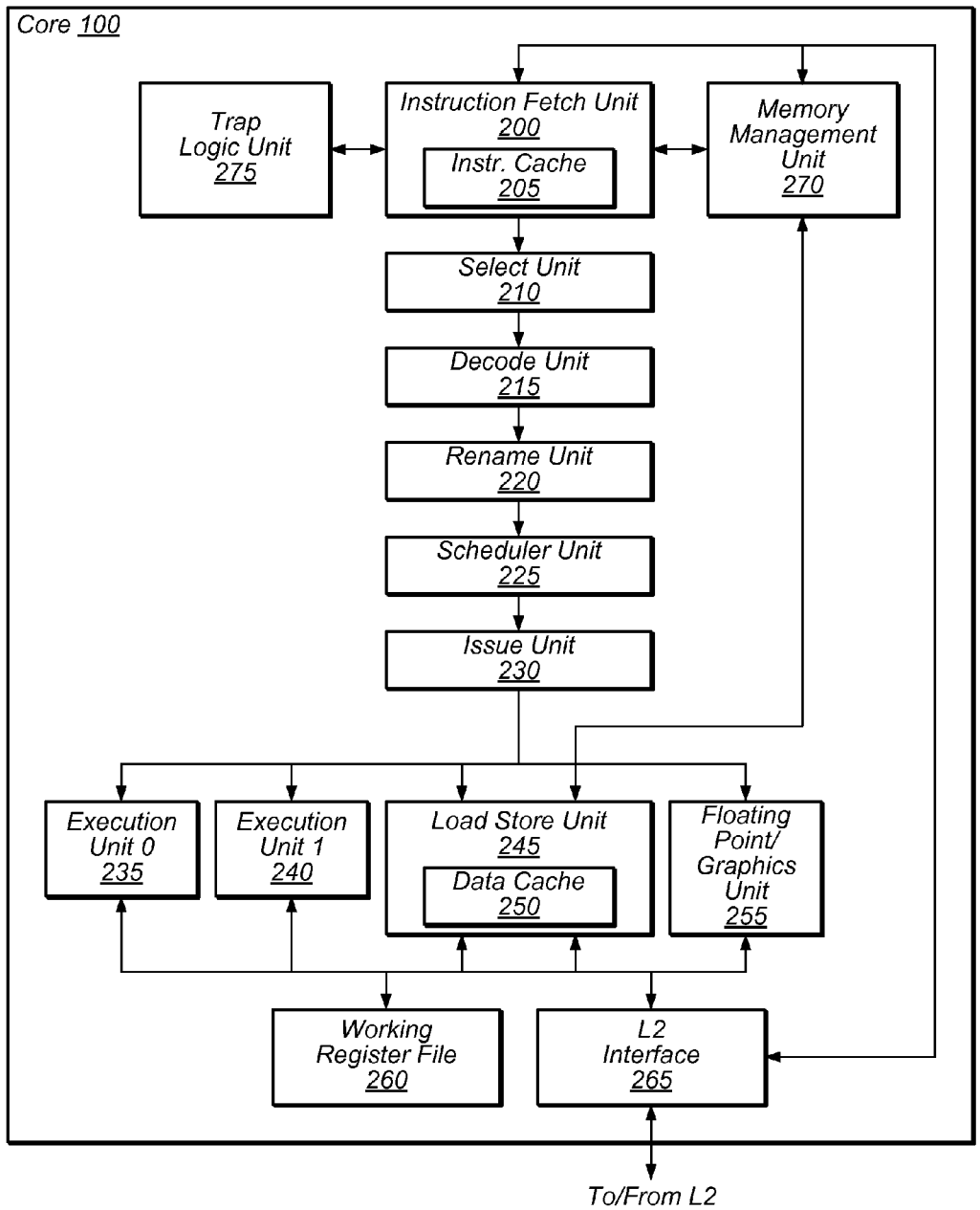
FIG. 2 is a block diagram illustrating one embodiment of an exemplary processor core.

The present disclosure describes embodiments of a division unit that is configured to facilitate execution of division instructions (and, in some embodiments, square root instructions) within a processor. FIGS. 1 and 2 present an overview of an exemplary multithreaded processor in which floating-point division and square root operations may be implemented with. FIGS. 3-6 present embodiments of a division unit that includes a single divide engine for executing instructions. FIGS. 7-11 present embodiments of a division unit that includes multiple divide engines for executing multiple instructions concurrently. Finally, FIG. 12 presents an overview of a computer system in which such a processor may be used.

General Overview of a Multithreaded Processor

Turning now to FIG. 1, a block diagram illustrating one embodiment of a processor 10 is shown. In certain embodiments, processor 10 may be multithreaded. In the illustrated embodiment, processor 10 includes a number of processor cores 100a-n, which are also designated "core 0" though "core n." As used herein, the term processor may refer to an apparatus having a single processor core or an apparatus that includes two or more processor cores. Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel (i.e., concurrently). Additionally, as described below in conjunction with the descriptions of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a write-back buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Turning now to FIG. 2, one embodiment of core 100 that is configured to perform dynamic multithreading is depicted. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a scheduler unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating-point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, scheduler unit 225 may be configured to pick (i.e., schedule/dispatch) instructions that are ready for execution and send the picked instructions to issue unit 230. In one embodiment, scheduler unit 225 may be configured to maintain a schedule queue that stores a number of decoded and renamed instructions as well as information about the relative age and status of the stored instructions. During each execution cycle, this embodiment of scheduler unit 225 may pick up to one instruction per slot. For example, taking instruction dependency and age information into account, for a given slot, scheduler unit 225 may be configured to pick the oldest instruction for the given slot that is ready to execute.

In some embodiments, scheduler unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, scheduler unit 225 may be configured to deliberately insert "holes" (as referred to as "bubbles") into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIST™) architecture, such as VIST™ 2.0 or VIST™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating-point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Overview of Floating-Point Division

Figure 3:
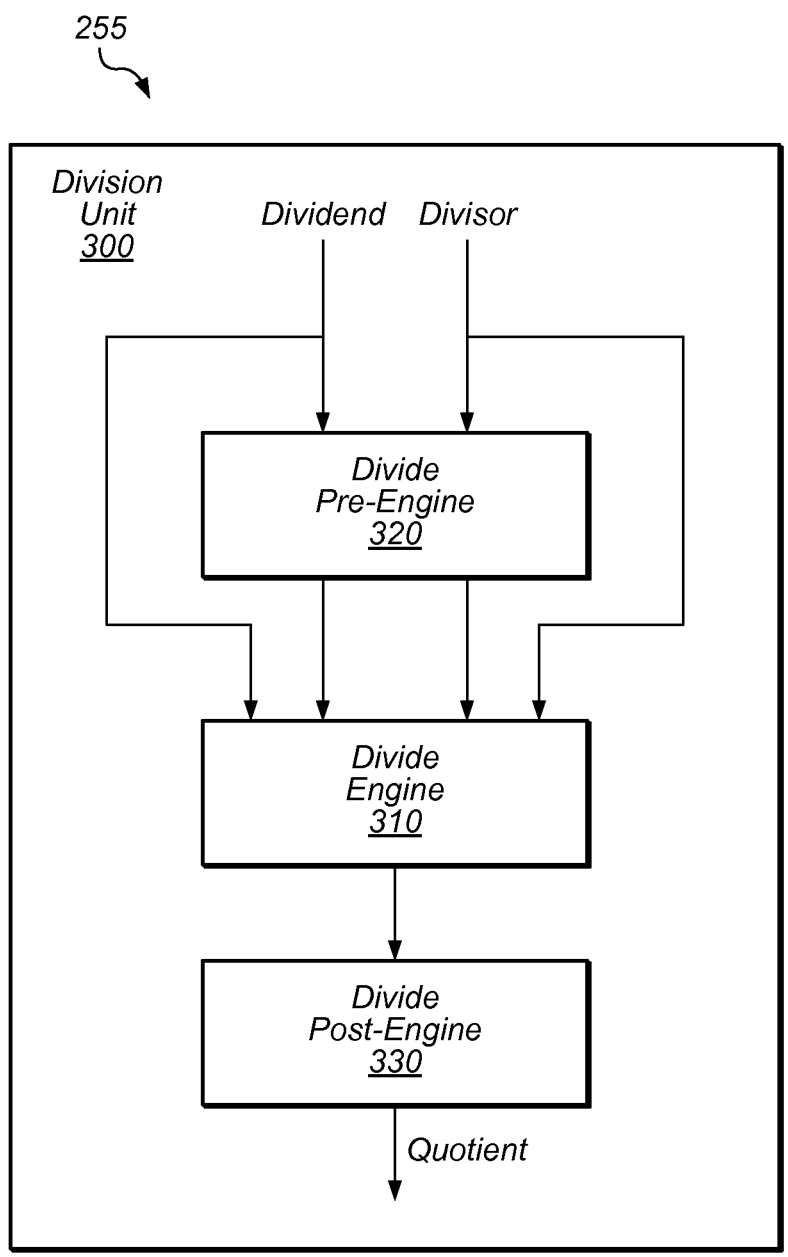
FIG. 3 is a block diagram illustrating one embodiment of a division unit.

Turning now to FIG. 3, a block diagram of a division unit 300 (which may be included within FGU 225) is depicted. As noted above, in some embodiments, FGU 255 may be configured to implement hardware support for various types of arithmetic operations. In the illustrated embodiment, FGU 255 includes a hardware division unit 300 that may be configured to perform division (and, in some embodiments, square root operations) using floating-point operands. As shown, division unit 300 may include a divide engine 310, divide pre-engine 320, and divide post-engine 330.

Generally speaking, divide engine 310 may be configured to iteratively produce a quotient from a dividend (i.e., a numerator) and a divisor (i.e., a denominator). To do so, divide engine 310 may include circuitry configured to implement any of a number of subtractive division algorithms or other suitable iterative approaches to computing a quotient. Subtractive division algorithms may generally be characterized by the following equation:

$$P_{j+1} = rP_j - q_{j+1}D$$

where Pj denotes the partial remainder (which is initially set to the dividend), r denotes the radix of the algorithm, D denotes the divisor, and qj+1 denotes the quotient digit corresponding to the partial remainder generated by a given iteration of the algorithm. As can be seen from the form of the subtractive division equation, successive partial remainders may be generated by multiplying a previous partial remainder by the radix (which may be implemented by a logical left shift operation when the partial remainder is a binary number and the radix is a power of 2) and then subtracting the product of the selected quotient digit and the divisor.

Numerous variations of subtractive division algorithms exist, and any suitable version may be implemented by divide engine 310 in various embodiments. For example, divide engine 310 may be configured to implement a restoring division algorithm in which the quotient digits q are selected from the set $\{0, 1\}$, or a non-restoring division algorithm in which the quotient digits q are selected from the set $\{-1, 1\}$ (i.e., employing a signed-digit representation). In another embodiment, divide engine 310 may be configured to implement a Sweeney, Robertson, and Tocher (SRT) non-restoring division algorithm in which quotient digits q are selected from the set $\{-1, 0, 1\}$.

As noted from the form of the subtractive division equation, the quotient digit is an input that determines the next partial remainder. Typically, the quotient digit may be selected at each iteration according to its effect or estimated effect on the resulting partial remainder: generally, when the algorithm terminates, the partial remainder should be as close to zero as possible while remaining positive. Thus, for example, in an iteration of radix-2 restoring division, the quotient digit may be initially estimated to be 1, and the dividend D may be subtracted from the shifted partial remainder 2Pj. If the new partial remainder resulting the subtraction is positive, the quotient digit estimation may be considered to be correct, and the iteration may terminate. If the new partial remainder resulting from the subtraction is negative, the initial quotient digit estimation of 1 in fact incorrectly overestimated the quotient digit for the current iteration. In this instance, the dividend D may be added back to the new partial remainder in order to negate the effect of the original estimation by restoring the original value of the shifted partial remainder 2Pj.

As just noted, restoring division involves the possibility of having to perform two addition-type operations per iteration: the initial subtraction of the divisor, and conditionally, the restoring addition of the divisor. Non-restoring division algorithms may generally avoid the restoring addition that results from overestimation of the quotient digit. Instead, non-restoring division may correct for overestimation of a prior quotient digit by selecting a negative quotient digit. However, for correct operation, it may still be necessary to limit the degree to which overestimation of a quotient digit may occur, which may be accomplished by ensuring that the partial remainders remain bounded within a defined range of values. In some embodiments, keeping the partial remainder bounded may be implemented by ensuring that the initial dividend and divisor are normalized (i.e., have a 1 in the most significant bit position), and by using an appropriate quotient digit selection function to estimate the quotient digits.

One embodiment of a quotient digit selection function for SRT non-restoring division is illustrated in the table below. In the following table, the most significant four bits of the partial remainder value 2Pj are given in 2's complement form as the input (also shown as an equivalent decimal fraction), and the corresponding value of the quotient digit qj+1 is given as the output. In this implementation, it is assumed that the partial remainder value is constrained as follows:

$$-5/2 \leq 2P_j \leq 3/2$$

Under such constraints, some possible values of 2Pj should not occur and are not shown; in some embodiments, these values may be used as don't-cares to simplify the logic that implements the quotient digit selection function.

| 2Pj | qj + 1 |
|---|---|
| 101.1 (−5/2) | −1 |
| 110.0 (−2) | −1 |
| 110.1 (−3/2) | −1 |
| 111.0 (−1) | −1 |
| 111.1 (−1/2) | 0 |
| 000.0 (0) | +1 |
| 000.1 (1/2) | +1 |
| 001.0 (1) | +1 |
| 001.1 (3/2) | +1 |

It is noted that this particular quotient digit selection function is but one possibility. Other embodiments are possible and contemplated, and any suitable function may be implemented by divide engine 310.

Figure 4A:
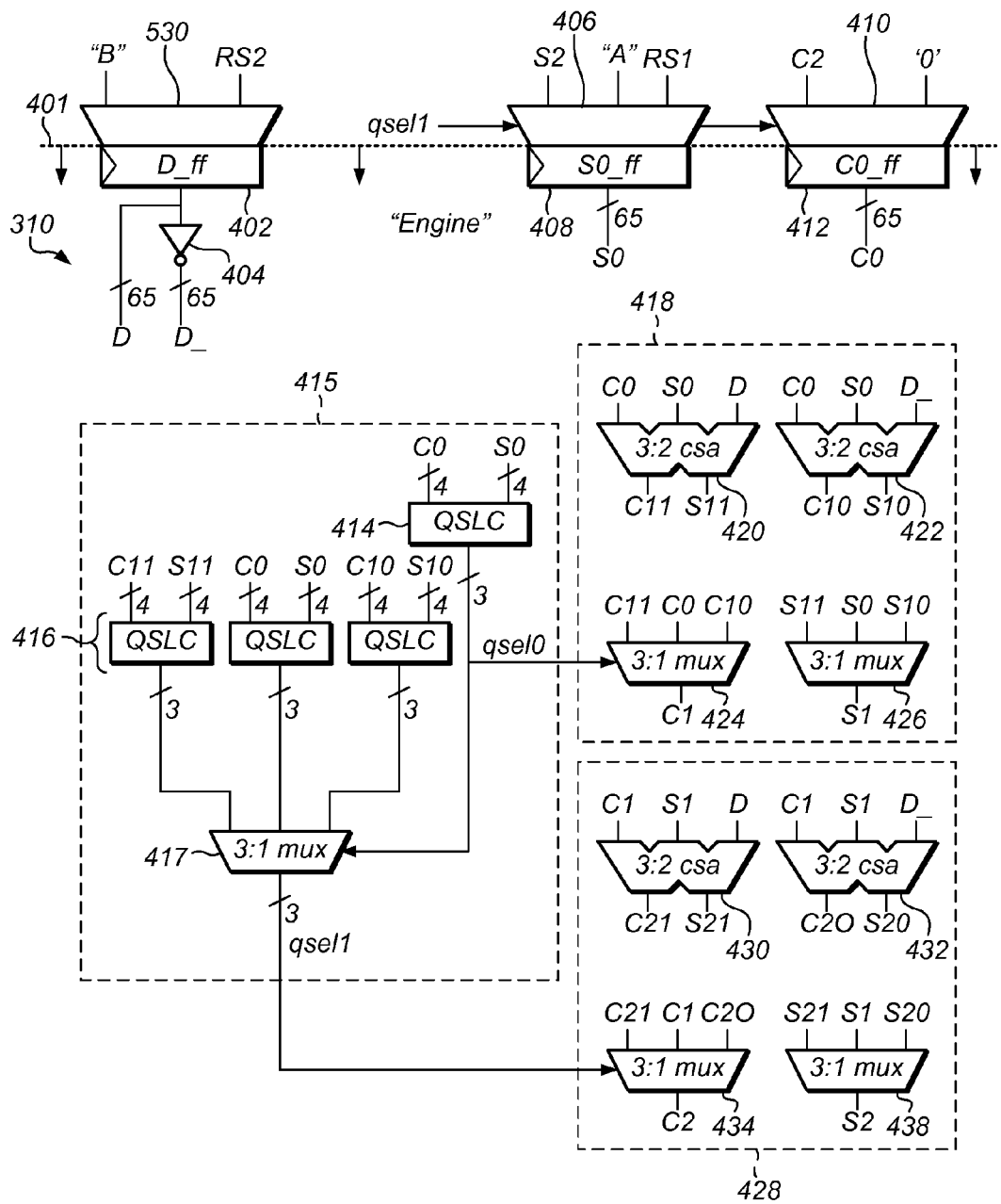
FIG. 4A is a block diagram illustrating one embodiment of a divide engine within the division unit.

Turning now FIG. 4A, one embodiment of a divide engine 310 that implements a radix-4 (2 bits per cycle) floating-point SRT divider is depicted. In the illustrated embodiment, flip-flop 402 may be configured to store the divisor value (denoted RS2) and to output a 65 bit divisor D including 64 data bits and one sign bit. Inverter gate 404 outputs a one's complement version of the divisor, denoted "D_". Flip-flops 408 and 412 may be configured to store the partial remainder generated by each iteration of the divide engine.

Flip-flops 408 and 412 may be configured to store the partial remainder in a redundant sum-and-carry format. This may enable the use of carry-save adders 420, 422, 430, and 432, which may typically be faster and more compact than carry-lookahead adders. Prior to commencement of division, the dividend is stored within flip-flop 408, and the value 0 is stored into flip-flop 412. Flip-flops 408 and 412 receive inputs from respective multiplexers 406 and 410, which are dependent upon a "qsel1" select signal generated from quotient selection logic block 415.

Quotient selection logic block 415 comprises a plurality of quotient selection logic circuits (QSLC). For each cycle, the four most significant bits of the carry portion of the partial remainder stored in flip-flop 412 and the sum portion of the partial remainder stored in flip-flop 408, indicated as "C0" and "S0," are input into QSLC 414. QSLC 414 may then be configured to output a "qsel0" signal for selecting a new quotient digit from the set $\{-1, 0, 1\}$ according to a quotient digit selection function, such as the function illustrated by the table given above. Additionally, qsel0 controls the selection of the second quotient digit, denoted "qsel1," via multiplexer 417. Multiplexer 417 selects this second quotient digit from one of the three instances of QSLC 416, each of which receives the four most significant sum and carry bits of CSA 420, CSA 422, or flip-flops 208 & 212, respectively.

Block 418 may be configured to calculate a partial remainder value based on the first quotient digit indicated by the qsel0 signal. Carry save adders 420 and 422 each input the contents of flip-flops 408 and 412 and one of D from flip-flop 402 or D_ from inverter 404. The outputs of carry save adders 420 and 422 are input into multiplexers 424 and 426 as shown. Multiplexers 424 and 426 receive select signal qsel0 to generate C1 and S1 values, which are carry and sum portions of a redundant-form intermediate partial remainder.

Block 428 may be configured to calculate a partial remainder value based on the second quotient digit indicated by the qsel1 signal and the partial remainder value produced by block 418. As shown, block 428 includes carry save adders 430 and 432 as well as multiplexers 434 and 438. The multiplexers 434 and 438 may be configured to receive select signal qsel1, indicative of the second quotient digit generated for the iteration, and to generate C2 and S2 values indicative of the final partial remainder for the current iteration. C2 and S2 are shifted left by one bit position (i.e., multiplied by 2) and stored back into flip-flops 408 and 412 for use during the next iteration.

As described above, two quotient digits per iteration may be produced by the illustrated embodiment of divide engine 310. Because the quotient digits are produced in a signed-digit encoding, they may need to be converted back to a two's complement form before the quotient is output from FGU 255. Any suitable one of a number of known techniques may be employed to convert the quotient into a suitable representation.

In addition to converting the quotient to its final representation, other operations may be performed on the quotient. For example, the quotient may need to be normalized and/or rounded according to an appropriate rounding scheme (such as, e.g., the various rounding schemes provided for IEEE 754 arithmetic). If the quotient is being determined within a saturating number system, the quotient may need to be saturated to a minimum or maximum value. Additionally, in some embodiments, the number of digits in the quotient may not be evenly divisible by the number of quotient digits produced per cycle. For example, in cases where the number of digits in the quotient is odd, the two-digit-per-cycle divide engine 310 will produce one more quotient digit than is required. Post-processing of the quotient may be needed to remove the spurious digit.

Figure 4B:
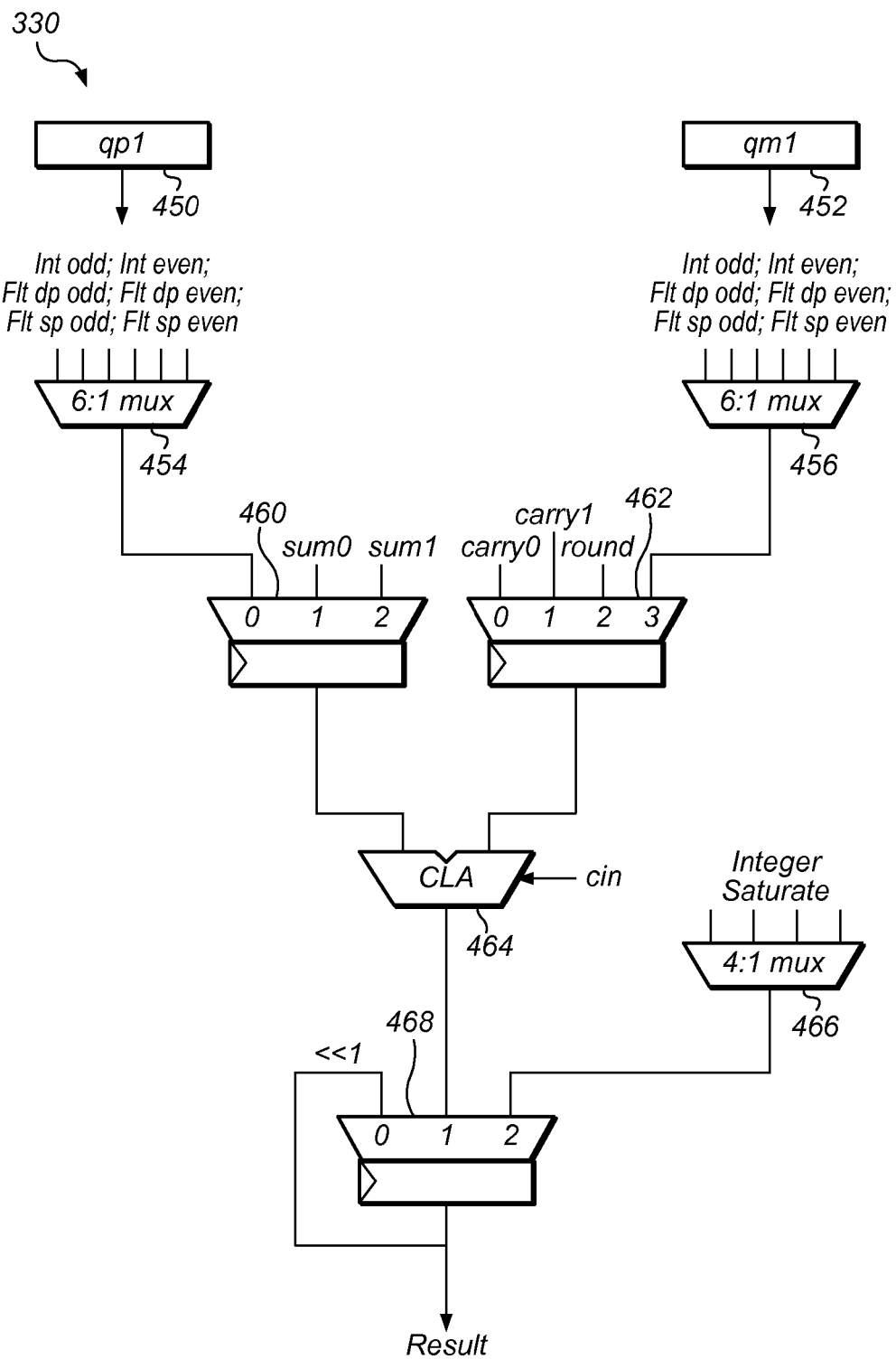
FIG. 4B is a block diagram illustrating one embodiment of a divide post-engine within the division unit.

In various embodiments, divide post-engine 330 may be configured to perform various ones of the post-processing operations just mentioned. One such embodiment of divide post-engine 330 is illustrated in FIG. 4B. In the illustrated embodiment, quotient digits are logged within registers qp1 450 and qm1 452 as they are produced by divide engine 310. Specifically, qp1 register 450 may be configured to log occurrences of +1 digits, while qm1 register 452 may be configured to log −1 digits. In the illustrated embodiment, occurrences of 0 digits may not be logged.

Once iteration is complete, the contents of qp1 register 450 and qm1 register 452 may be added within a full adder, such as carry lookahead adder 464, to produce the final quotient in a 2's complement format. As noted above, it may be necessary to remove spurious digits from the quotient, which may occur either before or after the addition of qp1 and qm1. In the illustrated embodiment, format multiplexers 456-462 may be configured to account for the various possible configurations of the quotient digits, which may vary depending on whether an even or odd number of quotient digits is required, and whether the result is to be formatted as an integer, a single-precision number, or a double-precision number (each of which may specify different numbers of quotient digits).

Generally speaking, if the quotient produced by divide engine 310 is not a denormal number, the maximum normalization shift that may be required to normalize the quotient is a shift by one bit position. Output multiplexer 468 may be configured to selectively implement this shift operation, which may be needed in the event that the normalized dividend is strictly less than the normalized divisor. Output multiplexer 468 may also be configured to select a saturated result in the event that such a result is appropriate.

Denormal Operand Support for Floating-Point Division

As noted above, to ensure correct operation, certain types of division algorithms may rely on the assumption that the input operands are normalized. Typically, floating-point operands are normalized by default. For example, the IEEE-754 (1985) floating-point arithmetic standard assumes that any representation of a floating-point value encoded with an exponent that is neither all zeros nor all ones denotes a normalized value. However, during operation, FGU 255 may also encounter denormal values, represented in IEEE-754 (1985) format as a nonzero fraction (mantissa) with a zero exponent.

Generally speaking, a denormal value represents a value that is smaller than is capable of being represented as a normalized number, given the smallest exponent that can be encoded. Because the number of bits available to represent the fraction is typically fixed, as denormal numbers approach zero and a greater number of fraction bits are used to represent leading zeros, fewer fraction bits may be available to represent the denormal value. Thus, denormal values may lose precision as they become smaller.

(The IEEE-754 (2008) standard preserves the encoding format of the 1985 standard with respect to denormal values, but renames denormal values as "subnormal" values. Where the term "denormal" is used herein, it is intended that this usage also encompass the term "subnormal" as it is employed in the newer standard. It is noted that in various embodiments, FGU 255 may comply with either the 1985 or 2008 versions of IEEE-754, or may implement any other suitable floating-point encoding that distinguishes normalized values from denormal values. The following discussion may be equally applicable to any such embodiment.)

In many typical hardware floating-point implementations, denormal operands are not supported for various operations, such as divide. In such implementations, when a denormal operand is detected for a divide operation, an exception or trap occurs, and a software routine handles the operation. However, implementing denormal support in software may require a substantially greater number of execution cycles to complete than a hardware implementation. On the other hand, because denormal operands are relatively infrequent, a hardware divider that supports denormal operands should attempt to minimize the impact that denormal support has on the processing of normalized operands to the extent possible.

In one embodiment, divide pre-engine 320 may be configured to detect and pre-normalize denormal divide operands before divide engine 310 begins determining the quotient. Additionally, divide pre-engine 320 may be configured to determine when a denormal result is expected to be produced from a division operation, which may occur regardless of whether the operands are normalized or denormal. Divide pre-engine 320 may also be configured to determine the number of digits in the quotient (NDQ) expected for a denormal result.

In the event of a denormal result, the number of digits in the quotient (NDQ) may be less than the full number of digits of precision provided for the intermediate quotient. In one embodiment, for IEEE 754 division, the full number of digits may be 26 bits for single precision and 55 bits for double precision, each including extra bits of precision maintained prior to final result rounding. (In other embodiments, it is contemplated that additional bits of precision may be employed to ensure the desired accuracy when the quotient is rounded to produce a final result.) When a denormal result is expected, it may be unnecessary for divide engine 310 to produce the full number of quotient digits possible for a normalized result. If the actual NDQ of the denormal result is known, divide engine 320 may be stopped after this number of digits has been generated, which may reduce the execution latency required to produce the denormal quotient.

In one embodiment, NDQ may be determined as a function of the exponents of the dividend and divisor, taking into account the number of leading zeros of either operand if it is denormal. In the following discussion, exponents are assumed to be formatted according to IEEE 754. In this format, a single-precision (SP) exponent is allowed to be in the range of −126 to +127, and is encoded as a biased 8-bit number ranging from 1 to 254 (with a bias value of 127). A double-precision (DP) exponent is allowed to be in the range of −1022 to +1023, and is encoded as a biased 11-bit number ranging from 1 to 2046 (with a bias value of 1023). However, it is contemplated the following techniques may be applied to any suitable exponent encoding, such as a sign/magnitude or 2's complement encoding, with appropriate arithmetic to account for the presence or absence of a bias.

Generally speaking, NDQ for a denormal result may be given as the number of digits in a full-precision divide result, less the number of digits of precision lost because of the denormal result. In one embodiment, the number of digits of precision lost may be given as the difference between the minimum valid exponent and the intermediate exponent, where the intermediate exponent is determined as the difference between the exponent of the normalized dividend and the exponent of the normalized divisor. Formally, this may be given as:

$$E_{int,norm} = E_{a,norm} - E_{b,norm}$$

where Ea,norm and Eb,norm denote the exponents of the normalized dividend and divisor respectively, and Eint,norm denotes the intermediate exponent assuming normalized operands. Then, $$NDQ = \min(NDQ_{full}, NDQ_{full} - (E_{min} - E_{int,norm}))$$

where NDQfull denotes the number of quotient digits in a full-precision divide result (in one embodiment, 26 for SP and 55 for DP), and Emin denotes the minimum valid exponent (in IEEE 754: −126 for SP and −1022 for DP). It is noted that in some embodiments, Eint,norm may be maintained in a biased representation rather than a signed absolute representation. In such embodiments, a bias term may be added to the difference equation given above for Eint,norm. However, in such embodiments, Emin would also be represented in biased format, such that the bias term would be canceled when generating NDQ according to the equation given above.

As an example, suppose a double-precision divide operation had a dividend a with a normalized IEEE 754 exponent of −1022+bias, and a divisor b with a normalized exponent of +10+bias. The intermediate exponent in biased form would then be −1032+bias. Given that the minimum DP exponent is −1022, the NDQ for this divide operation would be reduced by 10 digits, relative to a full-precision result (e.g., 45 digits in an embodiment where NDQfull=55 for DP).

The above discussion assumed that the divide operands were already normalized before the exponent arithmetic was performed. For denormal operands, the exponent arithmetic may be modified to account for the normalization shift that is applied to the operands prior to division. By definition, the mantissas of denormal numbers have leading zeros prior to their first nonzero digit. To normalize a denormal mantissa, the mantissa is shifted left by the number of leading zeros, which has the effect of multiplying the mantissa by 2 for each bit position shifted. To maintain the same arithmetic value, the exponent of the normalized mantissa may be decremented by 1 for each bit position the mantissa is shifted during normalization. (In a base-2 mantissa-exponent representation, decreasing the exponent by 1 has the effect of dividing the mantissa by 2, thus canceling the effect of multiplying the mantissa by 2.) Thus, the number of leading zeros in a denormal operand may indicate the amount by which the exponent should be decreased to reflect the normalization shift to be applied to the denormal operand.

In one embodiment, the intermediate exponent may be determined from the exponents of possibly-denormal operands as follows:

$$E_{int,norm} = (E_a - Z_a) - (E_b - Z_b) = (E_a - E_b) - Z_a + Z_b$$

where Ea and Eb respectively denote the exponents of the dividend and divisor, prior to any normalization shift, and Za and Zb respectively denote the number of leading zeros of the dividend and divisor, if any. As this formulation indicates, leading zeros in the dividend have the effect of reducing the normalized exponent of the dividend, and thus reducing the intermediate exponent. By contrast, leading zeros in the divisor reduce the normalized exponent of the divisor, and thus increase the intermediate exponent. (It is noted that if the dividend and divisor are both already in normalized format, both Za and Zb will be equal to zero, and this version of Eint,norm reduces to the one previously given.)

Figure 5:
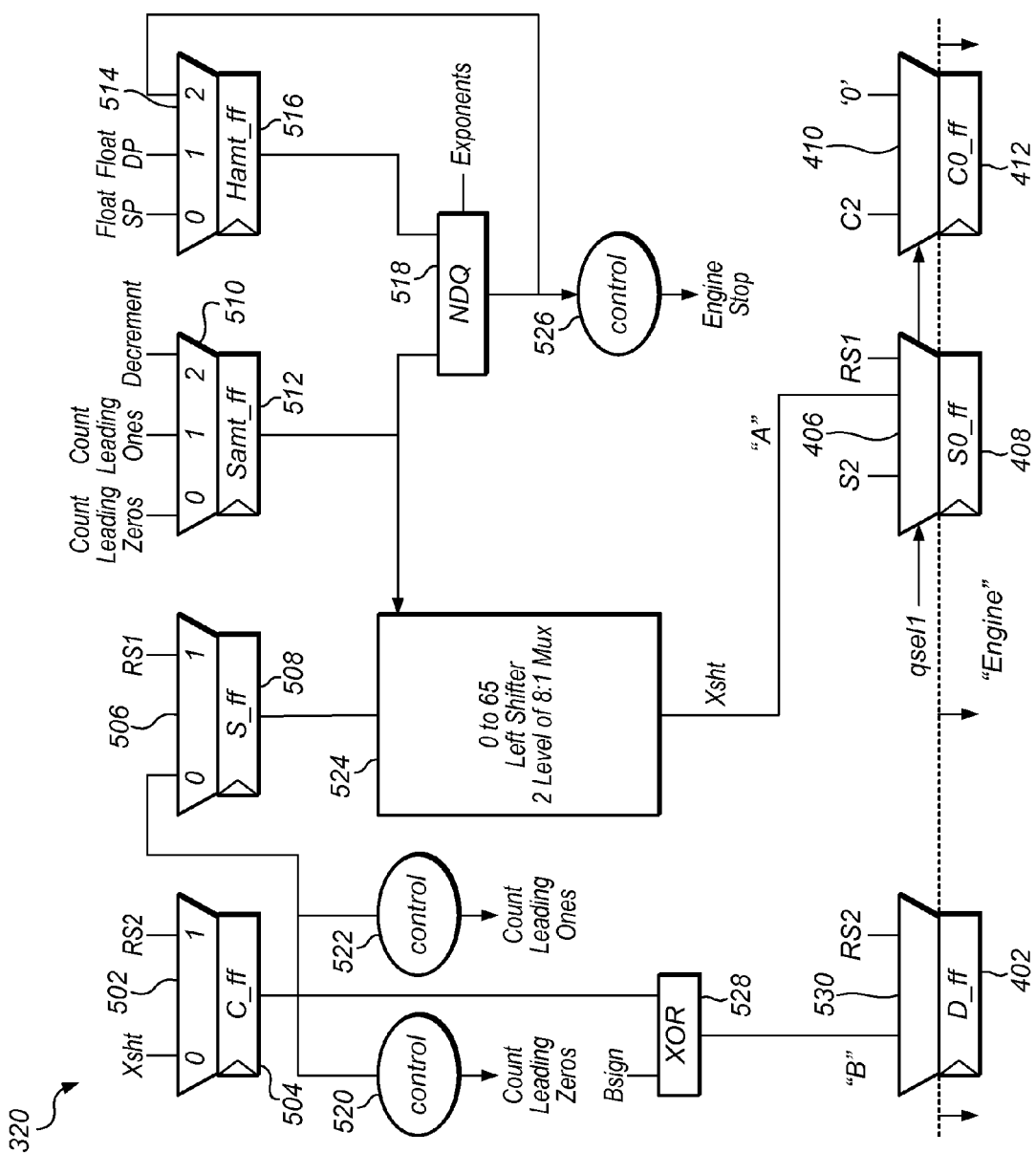
FIG. 5 is a block diagram illustrating one embodiment of a divide pre-engine within the division unit.

Turning now to FIG. 5, one embodiment of divide pre-engine 320 that is configured to process denormal floating-point operands prior to operation of divide engine 310 on those operands is depicted. In the illustrated embodiment, this circuit may be configured to determine whether either of the floating-point dividend or divisor is a denormal number, to normalize any denormal operands, to calculate NDQ given the operands, and to stop divide engine 310 after the number of cycles of operation determined by the calculated NDQ. Divide pre-engine 320 may also be referred to generically as an operand normalization circuit, though as just mentioned, it may be configured to implement functionality other than operand normalization.

It is noted that in some embodiments, divide engine 310 may be configured to perform division of integer operands in addition to division of floating-point operands. Integer operands bear some similarities to floating-point denormal operands, in that integer operands are not necessarily normalized, and thus may require normalization prior to division. In the illustrated embodiment, divide pre-engine 320 may also be configured to process integer operands prior to division, including normalizing integer operands as necessary, calculating NDQ for the integer division, and stopping divide engine 310 based on the calculated NDQ. However, it is noted that support for integer division within divide engine 310, divide pre-engine 320, and divide post-engine 330 is purely optional. In some embodiments, divide support for floating-point denormal operands may be implemented with no support whatsoever for integer division. Further, it is noted that the embodiment shown in FIG. 5 is purely exemplary, and that other embodiments that implement denormal and/or integer support in different fashions are possible and contemplated. For example, in other embodiments, the circuitry may be partitioned differently with respect to state elements (e.g., registers/flip-flops) than shown in FIG. 5.

In the embodiment of FIG. 5, the initial divisor is input via RS2 input of multiplexer 502 into flip-flop 504, and the initial dividend is input via RS1 input of multiplexer 506 into flip-flop 508. Generally speaking, flip-flop 504 may be configured to store a value whose leading zero or sign bits are to be counted, flip-flop 508 may be configured to store a value that is to be normalized via a left shift, and flip-flip 512 may be configured to store a number of positions by which the normalization shift is to occur. In a first cycle, control units 520, 522 calculate the leading zeros LZ (for a positive divisor) and leading ones L1 (for a negative divisor) to determine the leading sign bits of the divisor. The values LZ and L1 arrive at inputs (0, 1) of multiplexer 510 and the select value is based on the initial (sign) bit of the divisor. It is noted that when divide pre-engine 320 processes floating-point operands that are represented in sign-magnitude format, such as IEEE 754-compliant operands, the operand may always be considered positive, and leading ones may be disregarded. (In embodiments where integer divide support is omitted, leading-ones logic 522 may also be omitted.)

Once the number of leading zeros (or leading sign bits, in the case of integers) has been determined for the divisor, this values is then stored in flip-flop 512 as the shift amount "Samt". The divisor value, previously stored within flip-flop 504, is input into the first input (0) of multiplexer 506 for input into flip-flop 508, where it takes the place of the dividend previously stored in flip-flop 508. Meanwhile, the dividend passes through left shifter 524 (without any shifting) and arrives at the Xsht input of multiplexer 502, to take the place of the divisor in flip-flop 504. This is indicated in FIG. 5 by the label "Xsht" at both the output of left shifter 524 and the input to multiplexer 502, which passes the shifted value to flip-flop 504. Thus, after the number of leading zeros is determined for the divisor, in the illustrated embodiment, the divisor and dividend exchange places within flip-flops 504 and 508.

In the second cycle, the number of leading zero bits (or leading sign bits, in the case of integers) of the dividend, now stored in flip-flop 504, are counted and presented to multiplexer 510 for storage in flip-flop 512. The dividend re-enters flip-flop 508 via the first input (0) of multiplexer 506. Meanwhile, the divisor, which was previously stored in flip-flop 508, passes through left shifter 524 and is left shifted by the number of leading zero or sign bits of the divisor, which was determined and stored into flip-flop 512 during the previous cycle. After the normalization shift, the normalized divisor is output from left shifter 524 and reenters flip-flop 504 via the Xsht input of multiplexer 502.

In the third cycle, the divisor, now normalized and located in flip-flop 504, passes through XOR 528 and enters flip-flop 402 via input "B" for input into divide engine 310. In the case of integer division, XOR 528 converts the divisor into a one's complement form when the divisor is negative, as indicated by Bsign. If the divisor is positive, then no change is made. For floating-point operands represented in sign/magnitude format, Bsign may be forced to zero and the divisor may pass through XOR 528 unmodified. Meanwhile, the dividend passes from flip-flop 508 through left shifter 524 to be normalized in the same manner that the divisor was normalized during the previous cycle. After normalization, the dividend is input via input "A" of multiplexer 406 into flip-flop 408, ready for division.

In the illustrated embodiment, divide pre-engine 320 includes NDQ logic 518, which may be configured to calculate the value NDQ. In one embodiment, the number of leading zero or sign bits of the divisor that was determined in the first cycle is input into flip-flop 512 via multiplexer 510, and then passed through NDQ logic 518 unmodified and stored into flip-flop 516. In the next clock cycle, the number of leading zero or sign bits of the dividend is determined and stored in flip-flop 512 via multiplexer 510. Once the numbers of leading zero or sign bits for the dividend and divisor (e.g., Za and Zb) are known, NDQ logic 518 may be configured to combine these terms with the exponents of the dividend and divisor (e.g., Ea and Eb), as well as information about the minimum exponent and the full number of quotient digits expected for the type of divide operation to be performed (e.g., Emin and NDQfull for an SP or DP divide) in order to determine NDQ for the current divide operation. For example, NDQ logic 518 may include one or more adders configured to perform the exponent arithmetic described above, or any suitable variant of that arithmetic.

Once NDQ for the current divide operation has been generated, control logic 526 may be configured to utilize NDQ to determine when divide engine 310 should be stopped. In one embodiment, control logic 526 may be configured as a counter that is initially set to the value of NDQ generated by NDQ logic 518. For each iteration performed by divide engine 310, the counter may be decremented by the number of quotient digits generated during that iteration (e.g., 2 quotient digits for a radix-4 implementation). When the counter equals zero (or falls below zero, in the event that NDQ is not an even multiple of the number of digits generated), the control logic 526 may signal that divide engine 310 should stop iterating. Numerous other embodiments of control logic 526 are possible and contemplated. For example, instead of being decremented from NDQ towards zero, a counter may be configured to increment from zero towards NDQ and to terminate when the counter equals or exceeds NDQ.

Other embodiments of divide pre-engine 320 are possible and contemplated. For example, instead of providing one normalizing shifter and normalizing each operand over two successive cycles, two normalizing shifters may be employed to concurrently normalize both operands.

Figure 6:
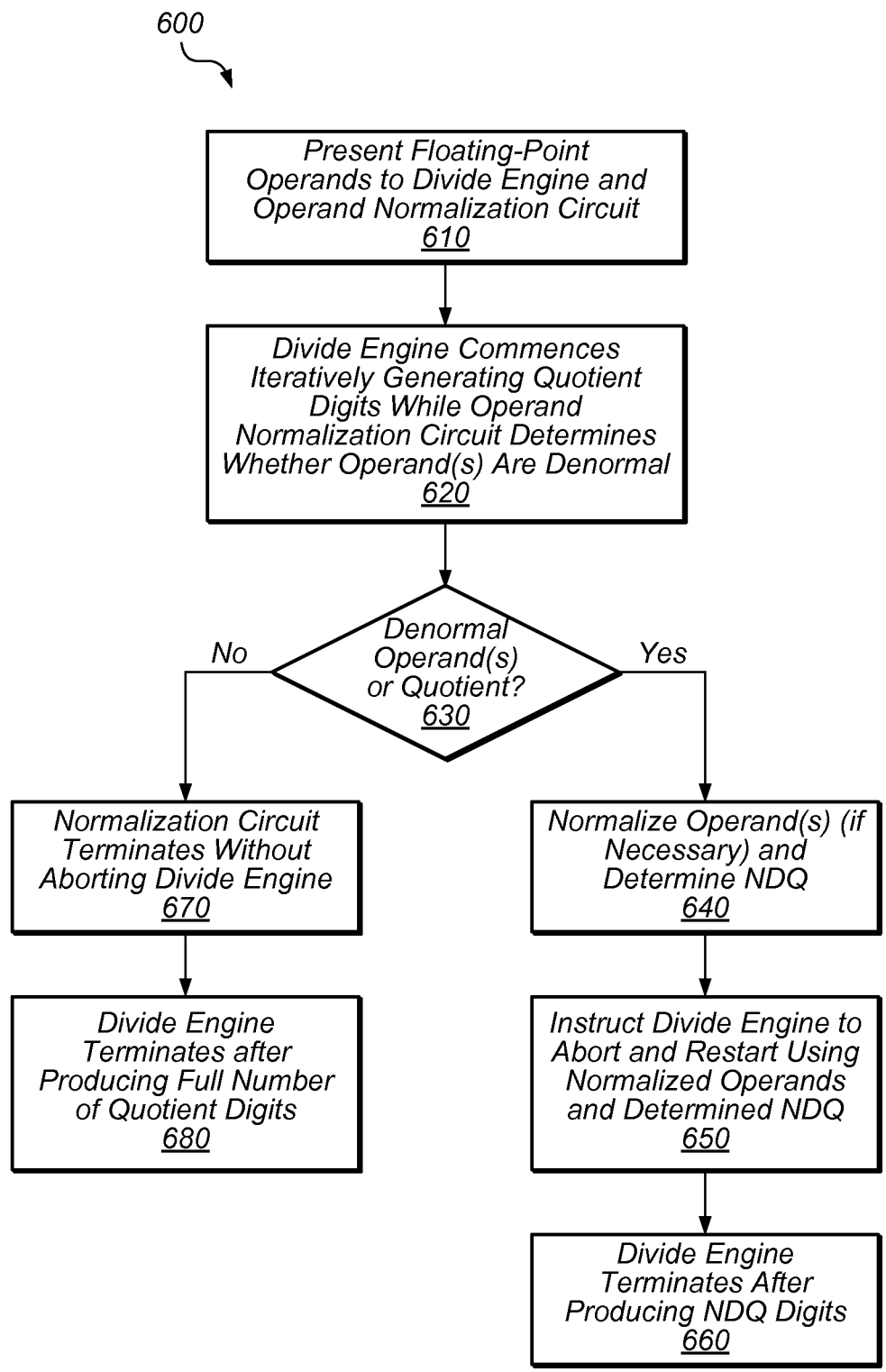
FIG. 6 is a flow diagram illustrating one embodiment of a method that may be performed by a division unit.

Turning now to FIG. 6, one embodiment of a method 600 that may be performed by division unit 300 is depicted. Referring collectively to FIGS. 3-6, operation begins in block 610 where floating-point operands for a floating-point divide operation are presented to both a divide engine and to an operand normalization circuit. For example, as shown in FIG. 3, the divide operands are concurrently presented both to divide engine 310 and to divide pre-engine 320.

In response to receiving the divide operands, divide engine 310 may commence iteratively generating quotient digits while divide pre-engine 320 determines whether either of the operands is a denormal number (block 620). That is, divide engine 310 may begin the division process before it is known whether there are denormal operands.

In response to determining that one or more of the operands is denormal or that the quotient is expected to be denormal (block 630), divide pre-engine 320 may normalize the denormal operand(s) (if necessary; in some instances a denormal quotient may result from already-normalized operands) and determine NDQ for the quotient (block 640). Divide pre-engine 320 may further instruct divide engine 310 to abort the previously-commenced generation of quotient digits and to restart generating quotient digits using the NDQ and normalized operands provided by divide pre-engine 320 (blocks 650). In this instance, divide engine 310 may terminate after producing NDQ quotient digits, as determined by divide pre-engine 320 (block 660).

In response to determining that none of the operands is denormal, divide pre-engine 320 may terminate processing of the floating-point divide operation without instructing divide engine 310 to abort the previously-commenced iterative generation of quotient digits (block 670). In this instance, divide engine 310 may terminate after producing the full number of quotient digits expected for the floating-point divide operation (block 680).

It is noted that in the embodiment shown in FIG. 6, divide engine 310 may begin the process of division under the assumption that the operands it has received are already normalized. Because denormal operands and/or results are relatively uncommon, this assumption is likely to be true in most cases. Thus, by speculating that the normalized case is the common case, the existence of hardware denormal support may not incur a performance penalty for the normalized case. In the event that the speculation is wrong, and one or more operands or the quotient is denormal, some work already performed by divide engine 310 may be discarded. However, in many instances, the divide engine 310 will perform fewer iterations once it is restarted.

Division Unit with Multiple Divide Engines

Figure 7:
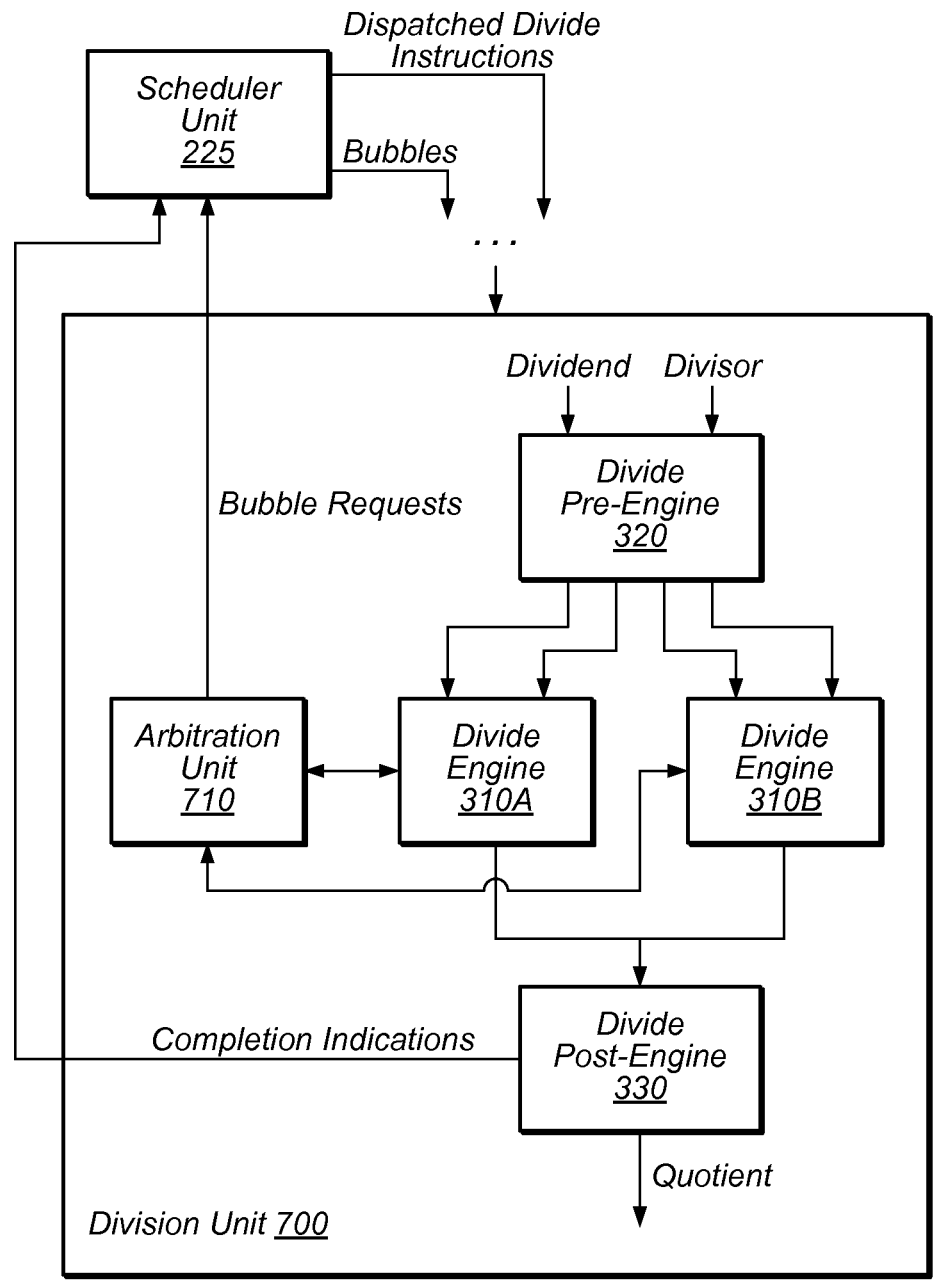
FIG. 7 is a block diagram illustrating another embodiment of a division unit that includes multiple divide engines.

Turning now to FIG. 7, a block diagram of another embodiment of a division unit 700 is depicted. As noted above, divide instructions and square root instructions can have relatively high execution latencies, which can hinder processor performance. In the illustrated embodiment, division unit 700 includes multiple divide engines 310A and 310B, divide pre-engine 320, divide post-engine 330, and arbitration unit 710. By having multiple divide engines 310, division unit 700, in many instances, can improve processor performance (e.g., a 5% improvement, in one instance) by allowing multiple divide instructions and/or square root instructions to be executed in parallel.

As discussed above, scheduler unit 225 may schedule instructions for issuance to various execution units (e.g., units 235-255) including division unit 700. In the illustrated embodiment, when a division instruction is dispatched to unit 700, the dividend and divisor operands for the instruction are received at divide pre-engine 320, where any denormal operands are normalized for divide engines 310 as discussed above. Once this normalization process has completed, the normalized operands are provided to an available one of engines 310. (Alternatively, in one embodiment, a set of operands may be provided to both divide pre-engine 320 and a divide engine 310 in parallel, so that engine 310 can begin performing the divide operation earlier in the event that divide pre-engine 320 determines that none of the operands are denormal.) The divide engine 310 may then perform a divide operation using any of the algorithms described above such as a restoring division algorithm, a non-restoring division algorithm, SRT, etc. Upon completion, an engine 310 may provide the results of the instruction to divide post-engine 330 for various post-processing operations such as conversion into two's complement form, rounding, removing spurious digits, or other operations discussed above. The final quotient value for the instruction is then inserted back into the instruction pipeline via a requested bubble inserted by scheduler unit 225, and proceeds on to commitment.

In various embodiments, engines 310-330 may be configured to process a respective set of operands for a single instruction within a given interval of time during which engines 310-330 are unavailable to process operands of additional instructions. In some embodiments, the interval for engines 320 and 330 may be a fixed amount of time. For example, in one embodiment, pre-engine 320 and post-engine 330 may both take four clock cycles to process a received set of operands. In some embodiments, the interval for engines 310 may vary (e.g., from 11-21 cycles). In order for division unit 700 to perform correctly, collisions (i.e., the event in which an engine receives two or more sets of inputs simultaneously or within close proximity) at engines 310-330 need to be avoided.

To prevent collisions at divide engines 310 and divide pre-engine 320, in one embodiment, scheduler 225 is configured to dispatch no more than a single divide instruction within a particular interval (e.g., a maximum of one instruction every four cycles—the time taken by pre-engine 320, in one embodiment), and to not dispatch more instructions than division unit 700 can process in parallel (e.g., two instructions—one for each divide engine 310). As will be discussed below, in various embodiments, scheduler unit 225 may be configured to dispatch divide instructions based on one or more counters that indicate when it last dispatched a divide instruction and the number of pending divide instructions (i.e., instructions that have been dispatched to unit 700 and have not yet completed being processed by unit 700). In one embodiment, scheduler 225 may be configured to adjust one or more values of these counters based on information received from division unit 700 such as a completion indication from unit 700 indicating when it has successfully generated an output for an instruction. Circuitry within scheduler 225 that is configured to coordinate the dispatching of divide instructions is described below with respect to FIG. 8.

To prevent collisions at the divide post-engine 330, in one embodiment, divide engines 310 are configured to request, from arbitration unit 710, permission to provide results to divide post-engine 330. In some embodiments, divide engines 310 may be configured to send a request a fixed number of cycles before a result has been produced based an expected time of completion (however, in other embodiments, divide engines 310 may submit requests upon producing a result). In one embodiment, if divide post-engine 330 unit will be available to process results from a requesting divide engine 310, arbitration unit 710 grants the request and allows the engine 310 to pass its results along. If, however, post-engine 330 will be unavailable (due to processing results produced by another engine 310), arbitration unit 710 may be configured to cause the engine 310 to wait until post-engine 330 is finished. As will be discussed below, in one embodiment, this waiting is performed by stopping a master clock of an engine 310 to cause it to maintain its current state. The clock is then restarted when post-engine 330 becomes available. In various embodiments, if arbitration unit 710 receives multiple requests simultaneously, arbitration unit 710 is configured to select one of engines 310 and to grant its request. Arbitration unit 710 may use any of a variety of suitable criteria for granting a request such as always selecting the same engine 310 in the event of a conflict (e.g., always picking engine 310A), not selecting the engine 310 that submitted the most recent request, etc. In the illustrated embodiment, arbitration unit 710 is further configured to submit bubble requests based on permission requests received from engines 310 (although, in other embodiment, bubble requests may come directly from engines 310 or some other unit). Circuitry within divide engines 310 that is configured to facilitate communication with arbitration unit 710 is described below with respect to FIG. 9.

By preventing collisions at pre-engine 320 and post-engine 330, division unit 700 is able to use multiple divide engines 310 and to share engines 320 and 330 among divide engines 310 without using additional buffers at engines 320 and 330 to store inputs until they can be processed.

Figure 8:
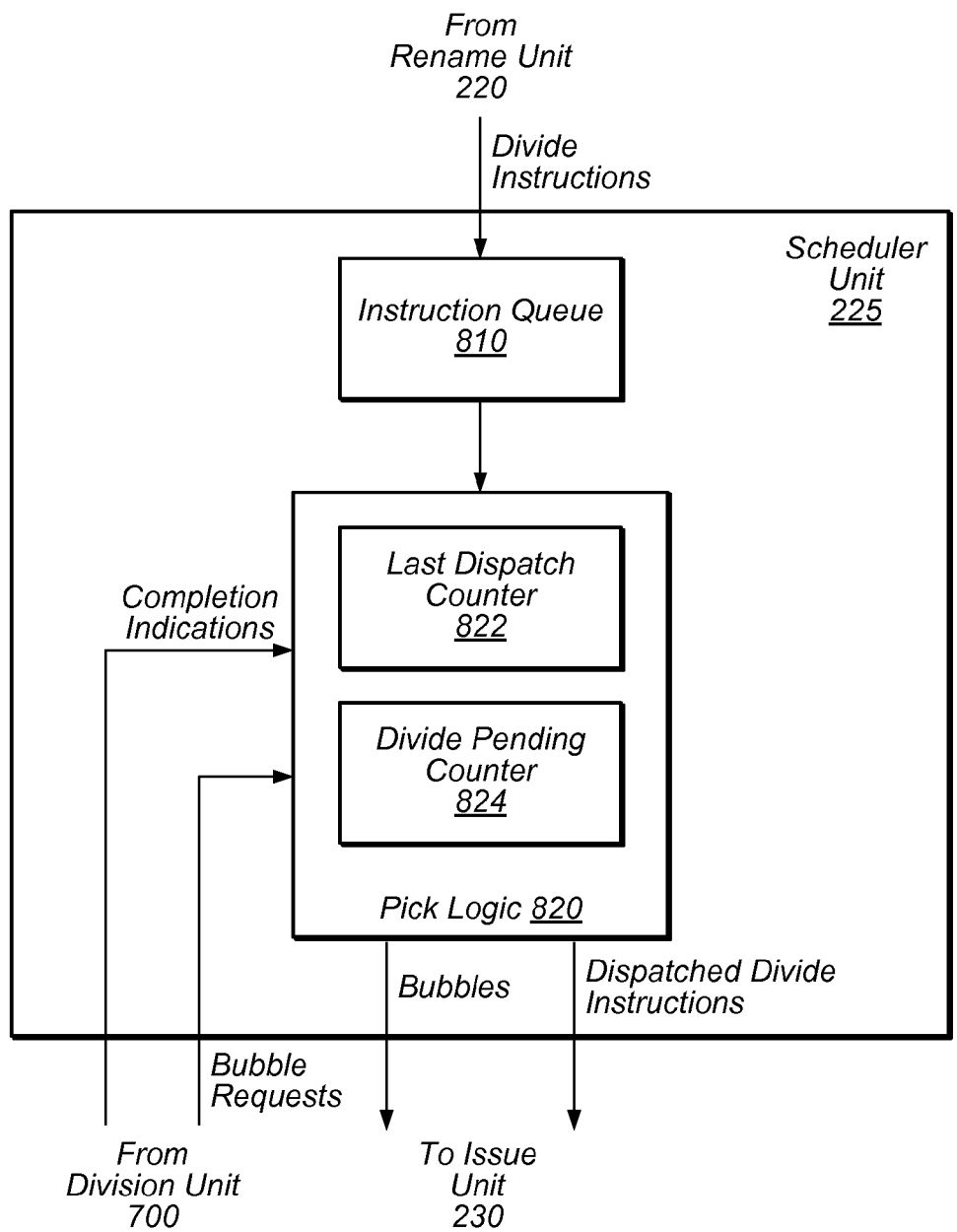
FIG. 8 is a block diagram illustrating one embodiment of a scheduler unit that is configured to dispatch instructions to the division unit.

Turning now to FIG. 8, a block diagram of scheduler unit 225 is depicted. As discussed above, in various embodiments, scheduler unit 225 may include circuitry configured to coordinate the dispatching of divide instructions. In illustrated embodiment, scheduler unit 225 includes an instruction queue 810 and pick logic 820. (It is noted that scheduler unit 225 may include additional units to those shown; still further, while units 810 and 820 are shown as being within scheduler unit 225, units 810 and 820 may be located elsewhere in a processor, in other embodiments.)

Instruction queue 810, in one embodiment, is configured to store decoded instructions until they can be dispatched (e.g., via issue unit 230) to their respective execution units. In various embodiments, instruction queue 810 may store instructions other than divide instructions.

Pick logic 820, in one embodiment, is configured to select instructions from queue 810 for issuance to various execution units. Pick logic 820 may use any of variety of criteria for selecting instructions such as instruction dependency, availability of execution units, time in queue, instruction priority, the thread identifier for that instruction, etc. Pick logic 820 may also be configured to insert bubbles (i.e., pipeline stalls) for various units so that they can commit results. In various embodiments, pick logic 820 is further configured to coordinate the dispatching of division instructions and bubbles with division unit 700. In the illustrated embodiment, pick logic 820 determines when to dispatch divide instructions from queue 810 based on the values of counters 822 and 824.

Last dispatch counter 822, in one embodiment, is configured to store a value indicating when it last dispatched a divide instruction. In various embodiments, pick logic 820 uses the value of counter 822 to ensure that it does not dispatch too many divide instructions (a single instruction, in one embodiment) within a given interval. In other embodiments, pick logic 820 may use other circuitry for tracking when it last dispatched a divide instruction such as a ring oscillator that is configured to assert an enable signal at a regular interval.

Divide pending counter 824, in one embodiment, is configured to store the number of pending divide instructions (or, the number of available divide engines 310, in another embodiment). In various embodiments, pick logic 820 uses the value of counter 824 to ensure that it does not dispatch more divide instructions than division unit 700 can process at a given time. For example, in one embodiment, counter 824 may be configured to store two busy bits (one for each engine 310 in the illustrated embodiment of FIG. 7) that are set (or cleared, in another embodiment) when divide instructions are dispatched and cleared (or set) upon receiving completion indications from division unit 700. Accordingly, if both bits are set indicating that the maximum number of pending division instructions has been reached, pick logic 820 may wait to dispatch subsequent divide instructions until one of the bits can be cleared.

Figure 9:
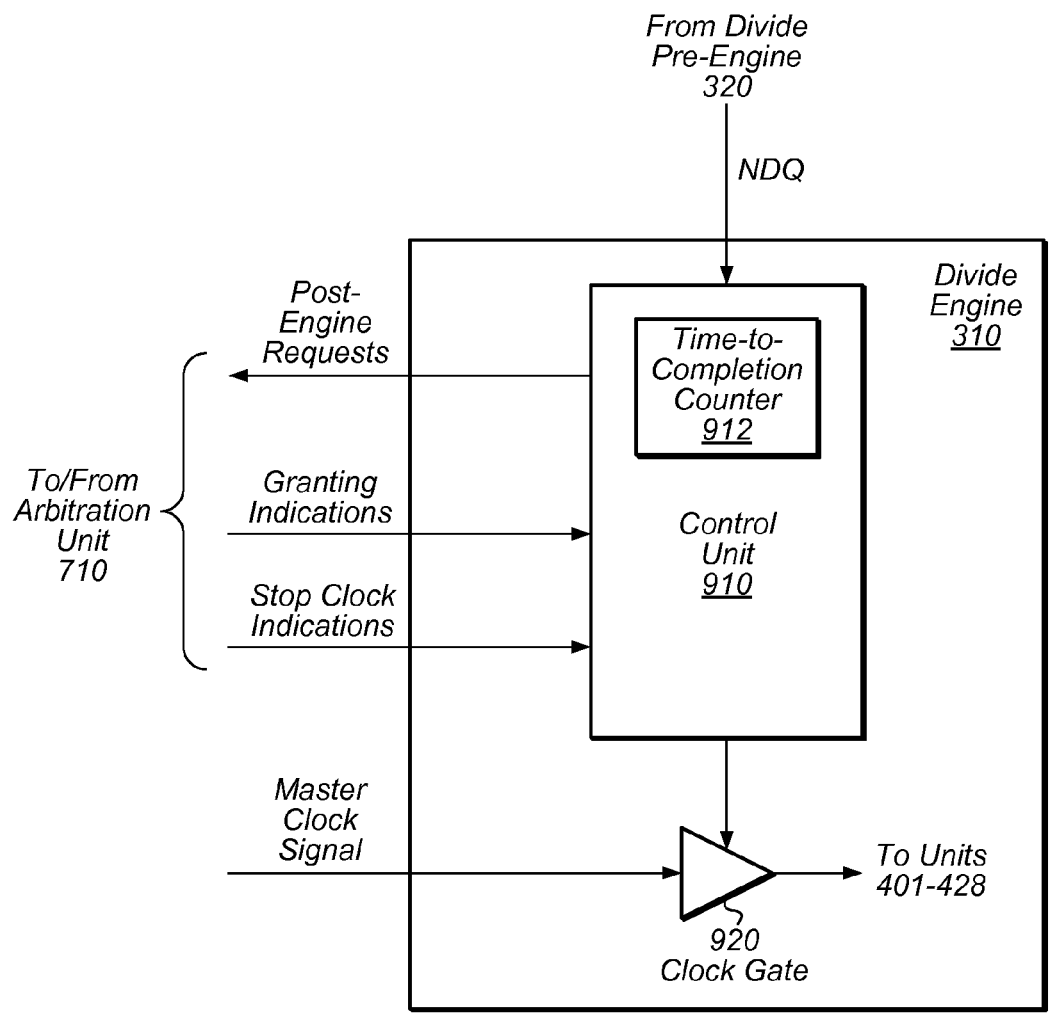
FIG. 9 is a block diagram illustrating another embodiment of a divide engine.

Turning now to FIG. 9, a block diagram of a divide engine 310 is depicted. As noted above, in various embodiments, divide engine 310 may include circuitry configured to facilitate communication with arbitration unit 710. In the illustrated embodiment, divide engine 310 includes control unit 910 and clock gate 920. Divide engine 310 may further include units 401-428, although these units are not depicted to simply the diagram (in other embodiments, engine 310 may be implemented differently than shown in FIG. 4).

Control unit 910, in one embodiment, is configure to determine when a divide engine 310 is expected to complete a divide operation, and to send a request for divide post-engine 330 based on this determination. Accordingly, in the illustrated embodiment, control unit 910 sets time-to-completion counter 912 to an initial value based on a determined number of digits in that will be present in the quotient (NDQ) (which may be determined by divide pre-engine 320 as discussed above). Control unit 910 then adjusts the value of counter 912 as iterations of the divide operation are performed by engine 310. In one embodiment, when counter 912 reaches a particular threshold value indicating that engine 310 will be finished in a particular number of cycles (e.g., eleven cycles), control unit 910 sends a corresponding request to arbitration unit 710.

In the illustrated embodiment, arbitration unit 710 may respond by either sending an indication granting the request or sending an indication instructing control unit 910 to stop (i.e., disable) the master clock for the divide engine 310. In the event that post-engine 330 will be available and arbitration unit 710 grants the request, in one embodiment, control unit 910 permits divide engine 310 to continue operation until it completes and its results are provided to divide post-engine 330. (As noted above, in some embodiments, arbitration unit 710 may also generate a bubble request for that engine 310 so that the bubble is available when post-engine 330 produces the final quotient.) In the event that post-engine 330 will be unavailable and arbitration unit 710 sends a stop-clock indication, in one embodiment, control unit 910 causes gate 920 to prevent the incoming master clock signal from proceed to other units in engine 310. This gating, in turn, prevents logic within engine 310 (e.g. units 401-428) from clocking and causes them to hold their present respective states. In one embodiment, once the interval for collision has passed, arbitration unit 710 may then grant the request allowing the engine 310 to proceed with the division operation. At which point, control unit 910 instructs gate 920 to ungate the master clock signal.

Figure 10:
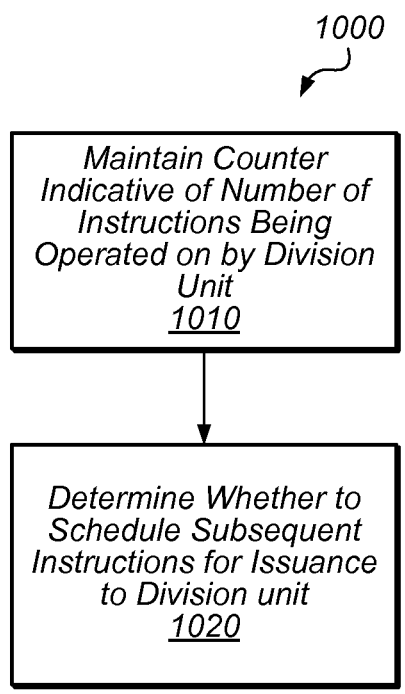
FIG. 10 is a flow diagram illustrating one embodiment of a method for preventing collision at a divide pre-engine in the division unit.

Turning now to FIG. 10, a flow diagram of a method 1000 for preventing overrunning a divide pre-engine (which, as noted above, may be referred to herein to as a normalization circuit) in a division unit is depicted. In one embodiment, method 1000 may be performed by a processor that includes a scheduler unit such as unit 225 and a divide pre-engine such as engine 320. In various embodiments, performance of method 1000 may permit usage of multiple divide engines with a common pre-engine to improve processor performance.

In step 1010, a processor maintains a counter (e.g., counter 824) indicative of a number of instructions currently being operated on by the division unit. As discussed above, step 1010 may include adjusting the value of the counter in response to 1) an issuance of a divide instruction to the division unit and 2) the divide post-engine (e.g., post-engine 330) outputting a quotient for an issued divide instruction as indicated by receiving a indication that the division unit has completed operation on a previously dispatched divide instruction (or, said another way, an indication that the division unit is available to process additional divide instructions).

In step 1020, the processor determines, based on the counter, whether to schedule subsequent instructions for issuance to the division unit. In one embodiment, this determination may be based on the value of the counter satisfying a particular threshold (e.g., a maximum number instructions that can be processed by the division unit). In some embodiments, the processor does not schedule more than one instruction for issuance to the division unit within a particular interval (e.g., the time taken by pre-engine 320 to normalize a set of operands).

Figure 11:
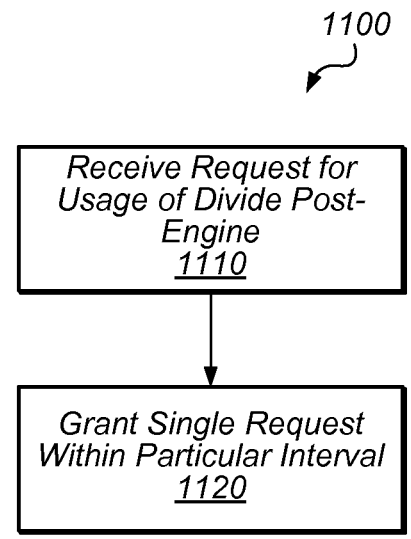
FIG. 11 is a flow diagram illustrating one embodiment of a method for preventing collision at a divide post-engine in the division unit.
Figure 12:
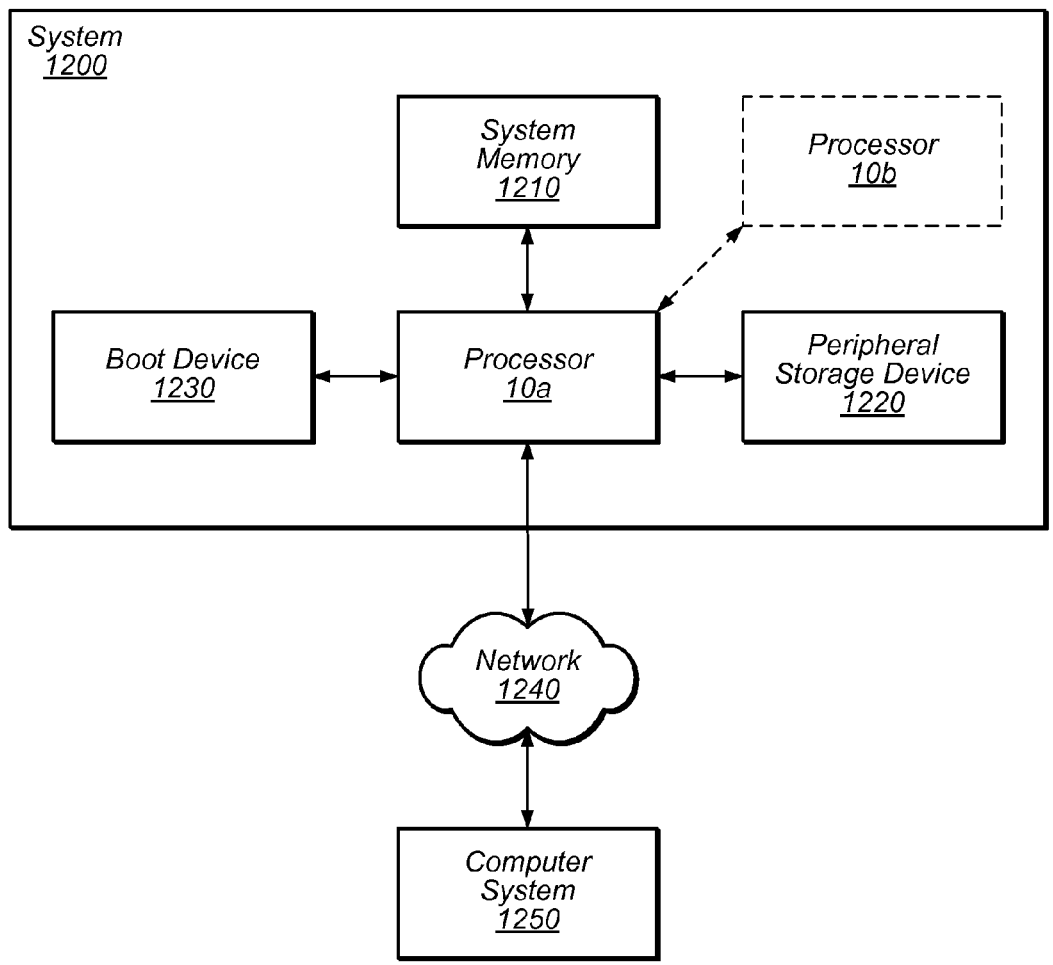
FIG. 12 is a block diagram illustrating one embodiment of an exemplary system.

Turning now to FIG. 11, a flow diagram of a method 1100 for preventing collision at a divide post-engine in the division unit is depicted. In one embodiment, method 1100 may be performed by an arbitration unit in a processor such as arbitration unit 710. In various embodiments, performance of method 1100 may permit usage of multiple divide engines with a common post-engine to improve processor performance.

In step 1110, an arbitration unit receives requests from multiple divide engines (e.g., engines 310) for usage of a common divide post-engine. As discussed above, a divide engine may make a determination of when it is expected to complete operation on a set of operands, and submit a request to the arbitration unit a particular number of clock cycles prior to completion of the operation. In one embodiment, this particular amount is determined based on a number of expected digits in a quotient being produced by a divide engine (e.g., an NDQ).

In step 1120, the arbitration unit grants only a single request within a particular interval. In some embodiments, step 1120 includes not only granting a received request of a divide engine, but also disabling a respective clock signal of one or more other divide engines having requests that were not granted within the interval. In one embodiment, the particular interval is an amount of time for the divide post-engine to produce a quotient after receiving an input from one of the divide engines.

Exemplary System Embodiment

As described above, in some embodiments, processor 10 of FIG. 1 may be configured to interface with a number of external devices. One embodiment of a system 1200 including processor 10 is illustrated in FIG. 12. In the illustrated embodiment, system 1200 includes an instance of processor 10, shown as processor 10a, that is coupled to a system memory 1210, a peripheral storage device 1220 and a boot device 1230. System 1200 is coupled to a network 1240, which is in turn coupled to another computer system 1250. In some embodiments, system 1200 may include more than one instance of the devices shown. In various embodiments, system 1200 may be configured as a rack-mountable server system, a standalone system, or in any other suitable form factor. In some embodiments, system 1200 may be configured as a client system rather than a server system.

In some embodiments, system 1200 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 160.

In various embodiments, system memory 1210 may comprise any suitable type of system memory as described above, such as FB-DIMM, DDR/DDR2/DDR3/DDR4 SDRAM, RDRAM®, flash memory, and of various types of ROM, etc. System memory 1210 may include multiple discrete banks of memory controlled by discrete memory interfaces in embodiments of processor 10 that provide multiple memory interfaces 130. Also, in some embodiments, system memory 1210 may include multiple different types of memory.

Peripheral storage device 1220, in various embodiments, may include support for magnetic, optical, or solid-state storage media such as hard drives, optical disks, nonvolatile RAM devices, etc. In some embodiments, peripheral storage device 1220 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 1220 may be coupled to processor 10 via peripheral interface(s) 150 of FIG. 1.

As described previously, in one embodiment boot device 1230 may include a device such as an FPGA or ASIC configured to coordinate initialization and boot of processor 10, such as from a power-on reset state. Additionally, in some embodiments boot device 1230 may include a secondary computer system configured to allow access to administrative functions such as debug or test modes of processor 10.

Network 1240 may include any suitable devices, media and/or protocol for interconnecting computer systems, such as wired or wireless Ethernet, for example. In various embodiments, network 1240 may include local area networks (LANs), wide area networks (WANs), telecommunication networks, or other suitable types of networks. In some embodiments, computer system 1250 may be similar to or identical in configuration to illustrated system 1200, whereas in other embodiments, computer system 1250 may be substantially differently configured. For example, computer system 1250 may be a server system, a processor-based client system, a stateless "thin" client system, a mobile device, etc. In some embodiments, processor 10 may be configured to communicate with network 1240 via network interface(s) 160 of FIG. 1.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
   a division unit including a normalization circuit and a plurality of divide engines, wherein the normalization circuit is configured to normalize a set of operands of a divide instruction, and wherein each divide engine is configured to operate on a respective normalized set of operands in parallel with one or more others of the plurality of divide engines, and wherein each respective normalized set of operands is received from the normalization circuit and is associated with a respective divide instruction; and
   a scheduler unit configured to dispatch instructions to a plurality of execution units including the division unit, wherein the scheduler unit is configured to dispatch a divide instruction to the division unit in response to receiving a first indication that the division unit has completed operation on a previously dispatched divide instruction, wherein the first indication is indicative that one of the plurality of divide engines is available to receive another divide instruction.

2. The integrated circuit of claim 1, wherein the scheduler unit is configured to:
   maintain an availability counter indicative of a number of dispatched instructions being operated on by the division unit; and
   dispatch an instruction in response to a value of the counter satisfying a particular threshold.

3. The integrated circuit of claim 1, wherein the scheduler unit is configured to:
   receive a second indication from the division unit prior to receiving the first indication, wherein the second indication is a request for a pipeline stall usable to transmit a result of a divide operation from the division unit; and
   in response to the second indication, initiate the requested pipeline stall.

4. The integrated circuit of claim 1, wherein the division unit further includes a divide post-engine configured to process results produced by each divide engine, and wherein each divide engine is configured to request, from an arbitration unit, permission to send a result to the divide post-engine.

5. The integrated circuit of claim 4, wherein the arbitration unit is configured to:
   grant a received request of a first one of the plurality of divide engines; and
   disable a clock signal of a second one of the plurality of divide engines in response to receiving a request of the first divide engine and a request of the second divide engine within a particular interval.

6. The integrated circuit of claim 1, wherein each divide engine is configured to perform a Sweeney, Robertson, and Tocher (SRT) division operation.

7. An integrated circuit, comprising:
   a division unit configured to operate on a plurality of division instructions in parallel via a plurality of divide engines included in the division unit, wherein the division unit includes a normalization circuit configured to normalize a set of operands being processed by the division unit to perform a division operation, wherein each of the plurality of divide engines is configured to operate on a normalized set of operands for a respective one of the plurality of division instructions;
   a scheduler unit configured to select instructions for issuance to a plurality of execution units including the division unit, wherein the scheduler unit is configured to:
      maintain an availability counter indicative of the division unit's ability to receive another division instruction at one of the plurality of divide engines; and
      based on the availability counter, determine whether to schedule a subsequent instruction for issuance to the division unit.

8. The integrated circuit of claim 7, wherein the normalization circuit is configured to normalize a set of operands associated with only a single divide instruction within a particular interval, and wherein the scheduler unit is configured to not select more than one instruction for issuance to the division unit within that interval.

9. The integrated circuit of claim 7, wherein the division unit includes:
   a divide post-engine configured to process results produced by the plurality of divide engines.

10. The integrated circuit of claim 9, wherein the division unit includes an arbitration unit configured to arbitrate between the plurality of divide engine to submit a result to the divide post-engine.

11. The integrated circuit of claim 9, wherein the scheduler unit is configured to adjust a value of the counter in response to 1) an issuance of a divide instruction to the division unit, and 2) the divide post-engine outputting a quotient for an issued divide instruction.

12. The integrated circuit of claim 9, wherein the plurality of divide engines are configured to implement a restoring division algorithm.

* * * * *